(12) United States Patent
Griffin et al.

(10) Patent No.: US 12,021,272 B2
(45) Date of Patent: Jun. 25, 2024

(54) SYSTEMS FOR SUPPRESSING ADVERSE EXOTHERMIC REACTIONS IN ENERGY STORAGE CONTAINERS

(71) Applicant: The Boeing Company, Chicago, IL (US)

(72) Inventors: Stephen D. Griffin, Long Beach, CA (US); Douglas E. Ferguson, Cypress, CA (US); Aaron J. Kutzmann, Long Beach, CA (US); John A. Trela, Seattle, WA (US); Frederic Lacaux, Woodinville, WA (US)

(73) Assignee: The Boeing Company, Arlington, VA (US)

( * ) Notice: Subject to any disclaimer, the term of this patent is extended or adjusted under 35 U.S.C. 154(b) by 237 days.

(21) Appl. No.: 17/687,622

(22) Filed: Mar. 5, 2022

(65) Prior Publication Data

US 2022/0320697 A1    Oct. 6, 2022

Related U.S. Application Data

(60) Provisional application No. 63/171,164, filed on Apr. 6, 2021.

(51) Int. Cl.
*H01M 50/682* (2021.01)
*H01M 10/48* (2006.01)
(Continued)

(52) U.S. Cl.
CPC ....... *H01M 50/682* (2021.01); *H01M 10/482* (2013.01); *H01M 10/615* (2015.04);
(Continued)

(58) Field of Classification Search
None
See application file for complete search history.

(56) References Cited

U.S. PATENT DOCUMENTS

| 4,356,868 A | 11/1982 | Bentley et al. |
|---|---|---|
| 4,635,670 A | 1/1987 | Kilmoyer |

(Continued)

FOREIGN PATENT DOCUMENTS

| CN | 111769726 | * 10/2020 |
|---|---|---|
| CN | 112618994 | * 4/2021 |

(Continued)

OTHER PUBLICATIONS

Weiqiang et al., Abstract of "Experimental study on suppression of fire and explosion of lithium iron phosphate battery by inert gas", 2018 IEEE International Conference of Safety Product Information (IICSPI), Dec. 10-12, 2018, Chongqing, China.

(Continued)

*Primary Examiner* — Lisa S Park
(74) *Attorney, Agent, or Firm* — Ostrager Chong Flaherty & Broitman P.C.

(57) ABSTRACT

Systems for suppressing adverse exothermic reactions in an energy storage container. One energy storage system includes a container configured to support a plurality of battery cells; a plurality of battery cells disposed inside and supported by the container; an agent supply port attached to the container; and a tube disposed inside the container and having a closed end and an open end. The open end of the tube is in fluid communication with the agent supply port. The tube comprises fusible portions which are designed to melt or soften at a temperature which is lower than the melting or softening temperature of another portion of the tube. In response to melting or softening of the fusible portions of the tube, pressurized exothermic reaction-suppressing agent is distributed inside the container via the tube.

20 Claims, 11 Drawing Sheets

(51) Int. Cl.
  *H01M 10/615* (2014.01)
  *H01M 10/63* (2014.01)
  *H01M 10/657* (2014.01)
  *H01M 50/213* (2021.01)
  *H01M 50/267* (2021.01)
  *H01M 50/627* (2021.01)

(52) U.S. Cl.
  CPC ......... *H01M 10/63* (2015.04); *H01M 10/657* (2015.04); *H01M 50/213* (2021.01); *H01M 50/627* (2021.01); *H01M 2200/10* (2013.01)

(56) References Cited

U.S. PATENT DOCUMENTS

| | | |
|---|---|---|
| 5,186,193 A | 2/1993 | Gullberg et al. |
| 6,763,894 B2 | 7/2004 | Schoenrock et al. |
| 9,010,449 B2 | 4/2015 | Eckholm et al. |
| 9,490,507 B2 | 11/2016 | Bandhauer et al. |
| 10,238,901 B2 | 3/2019 | Ferguson et al. |
| 10,286,235 B2 | 5/2019 | Smith et al. |
| 10,343,003 B2 | 7/2019 | Baker et al. |
| 2010/0136391 A1 | 6/2010 | Prilutsky et al. |
| 2013/0312947 A1 | 11/2013 | Bandhauer et al. |
| 2015/0069068 A1* | 3/2015 | Hariram ............. H01M 50/271 |
| | | 220/560.01 |
| 2016/0336627 A1 | 11/2016 | Syed et al. |
| 2019/0020076 A1* | 1/2019 | Campbell ............. G01K 11/20 |
| 2020/0373534 A1 | 11/2020 | Simpson et al. |
| 2020/0406078 A1 | 12/2020 | Melton et al. |
| 2022/0069367 A1* | 3/2022 | Kimura ................. H01H 85/11 |

FOREIGN PATENT DOCUMENTS

| | | |
|---|---|---|
| EP | 3333932 A1 | 6/2018 |
| EP | 3573169 A1 | 11/2019 |
| EP | 3761430 A1 | 1/2021 |
| JP | S50149184 A | 11/1975 |

OTHER PUBLICATIONS

Extended European Search Report (EESR) dated Dec. 12, 2022, in European Patent Application No. 22162201.2 (European counterpart of the instant U.S. patent application).

* cited by examiner

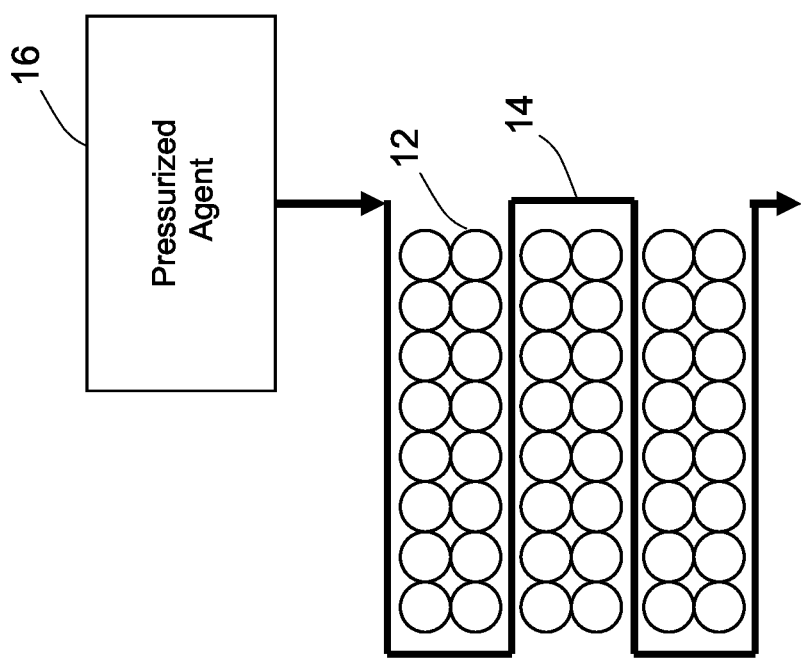

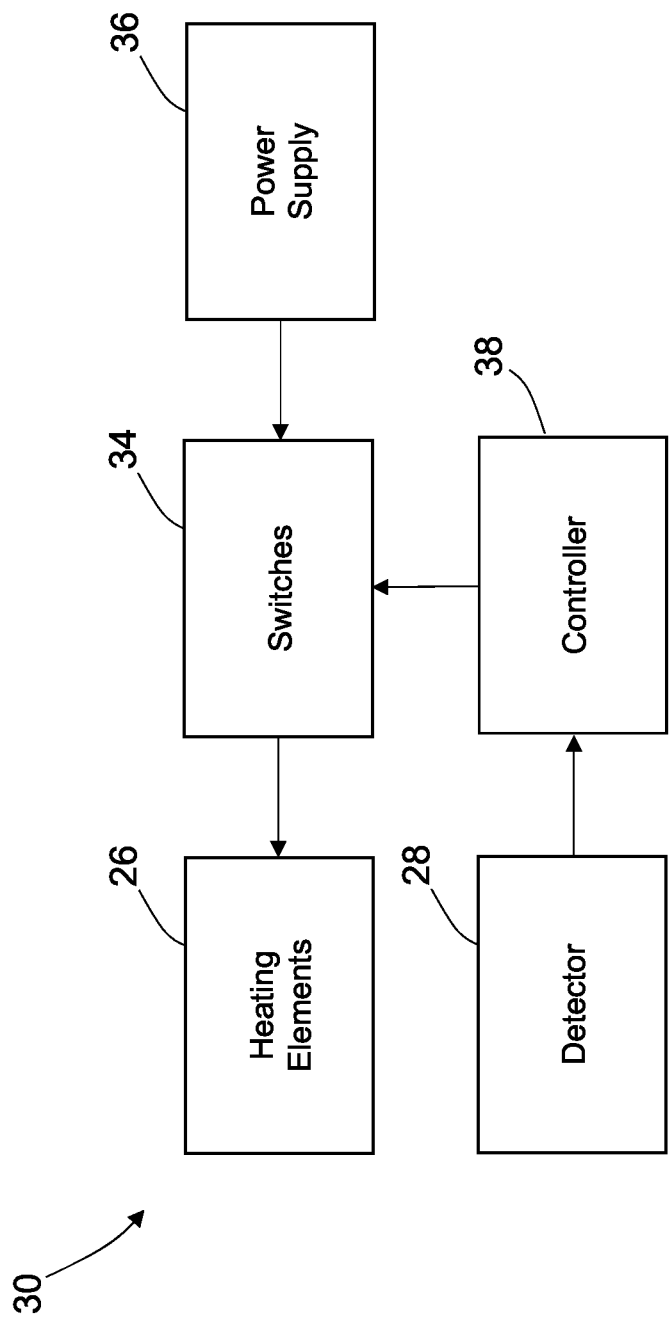

SYSTEMS FOR SUPPRESSING ADVERSE EXOTHERMIC REACTIONS IN ENERGY STORAGE CONTAINERS

RELATED PATENT APPLICATION

This application claims the benefit, under Title 35, United States Code, Section 119(e), of U.S. Provisional Application No. 63/171,164 filed on Apr. 6, 2021.

BACKGROUND

This application relates to suppression of adverse exothermic reactions (e.g., fires or thermal runaway) in energy storage containers and, more particularly, to the suppression of adverse exothermic reactions in batteries onboard aircraft.

Fire suppression systems often use a pressurized fluid, such as compressed gas, which is released when an adverse exothermic reaction is detected. In some automatic fire suppression systems, a cylinder filled with compressed gas (e.g., carbon dioxide) is connected to a length of fusible tubing. The fusible tubing is designed to rupture when heated to a sufficiently high temperature, such that the compressed gas is released at the location of the adverse exothermic reaction. Such systems may be installed in industrial machinery, electrical panels and devices, and vehicles.

Aircraft, particularly commercial passenger aircraft, are commonly equipped with a fire protection system in the cargo compartment. A typical fire protection system comprises two sub-systems: a fire detection system and a fire suppression system. The fire detection system includes one or more fire detectors (e.g., smoke detectors) and the fire suppression system is capable of dispensing a fire suppression agent. When a fire is detected in the cargo compartment, the fire suppression agent is released and floods the cargo compartment. The release of agent may occur automatically in response to detection by a fire detector or, alternatively, may occur in response to manual pilot intervention (e.g., closure of a switch following a warning signal).

Current aircraft protection involves defining packaging regulations for energy storage containers or limitations on cargo content to protect aircraft through mitigation of an initial event. For aircraft batteries, these methods are very heavy and impose a performance penalty on the aircraft. For cargo carriage of batteries, mitigation requires a level of commitment from both airlines and manufacturers which utilize air shipping. Current agreements are difficult to enforce. With regard to usage of energy storage containers on aircraft, methodologies are available for suppressing ongoing fire events. However, these methodologies are insufficient when employed to suppress ongoing thermal runaway events in high-energy density batteries such as lithium-ion cells.

SUMMARY

The subject matter disclosed below is directed to systems for suppressing adverse exothermic reactions in an energy storage container. In accordance with various embodiments, a protective system is integrated as a structural component of the energy storage container. The system includes rigid tubing which is routed within the energy storage container. The rigid tubing serves as the means for distributing an exothermic reaction-suppressing non-conductive agent in a fluid state. As used herein, the term "tubing" means a plurality of tubes. Such a plurality of tubes may be in fluid communication with a common agent supply port. The rigid tubing may also be configured to provide support for electrical components (such as battery cells) within the energy storage container.

The embodiments proposed herein include fusible components which are attached to or integrated with the rigid tubing. In accordance with one passive embodiment, each fusible component covers a respective aperture in a tube and is made of a material having a melting temperature which is lower than the melting temperature of the tube. In accordance with another passive embodiment, each fusible component is an integral relatively thinner portion of the tube that forms a respective opening as the relatively thinner portion melts faster than relatively thicker portions of the tube. Melting of each fusible component allows the exothermic reaction-suppressing fluid to be dispensed at a targetable location to mitigate the propagation of a fire or thermal runaway event (especially on an aircraft, inside of a pressurized, occupied volume). In accordance with one active embodiment, selected fusible components are electrically coupled to an electrical heating element for enabling manual or automated activation of melting of the fusible components. In accordance with a further hybrid embodiment, the system may include both passive and activatable fusible components. One benefit of such a hybrid embodiment is that activation of the method for dispersing exothermic reaction-suppressing fluid can be either passive or electrical, allowing for redundancy and reduction in failure.

In accordance with various embodiments, fusible components are used in an internal fluid distribution network within an energy storage container for targeted release of a nonconductive gaseous or liquid exothermic reaction-suppressing agent (hereinafter "exothermic reaction-suppressing agent") to area(s) involved in or contributing to ongoing fire or thermal runaway events. Optionally, the distribution network may be pre-charged with the exothermic reaction-suppressing agent to facilitate an immediate response to the exothermic reaction. After initial release, the exothermic reaction-suppressing agent will continue to be supplied to the distribution network from an external pressurized container. In one proposed implementation, the fusible components are coupled to an electrically based actuation component at several locations throughout the energy storage container, thereby enabling pilot activation of the distribution of fluid for the purpose of mitigating propagation of the fire or thermal runaway event to uninvolved entities.

Although various embodiments of systems for suppressing adverse exothermic reactions in an energy storage container will be described in some detail below, one or more of those embodiments may be characterized by one or more of the following aspects.

One aspect of the subject matter disclosed in detail below is an energy storage system comprising: a container configured to support a plurality of battery cells; a plurality of battery cells disposed inside and supported by the container; tubing disposed between the battery cells; and a plurality of strips which are attached to the tubing. The tubing has a plurality of apertures. The strips cover the plurality of apertures. The tubing is made of a first material having a first melting temperature. The strips are made of a second material having a second melting temperature which is lower than the first melting temperature. In response to uncovering of the apertures due to melting of the second material, pressurized exothermic reaction suppressing agent is distributed inside the container via the tubing.

Another aspect of the subject matter disclosed in detail below is an energy storage system comprising: a container configured to support a plurality of battery cells; an agent supply port attached to the container; a plurality of battery cells disposed inside and supported by the container; and a tube disposed inside the container and having a closed end and an open end, the open end of the tube being in fluid communication with the agent supply port, the tube comprising fusible portions which are designed to melt or soften at a temperature which is lower than the melting or softening temperature of another portion of the tube. In accordance with some embodiments of the energy storage system, the other portion of the tube comprises a relatively thicker portion of a wall and the fusible portion of the tube comprises a relatively thinner portion of the wall. In accordance with other embodiments of the energy storage system, the other portion of the tube comprises a wall having an aperture and the fusible portion of the tube comprises a fusible cover that covers the aperture when a temperature of the fusible cover is lower than a melting or softening temperature of the fusible cover. In accordance with further embodiments of the energy storage system, the other portion of the tube comprises a wall having first and second apertures and the fusible portion of the tube comprises a strip that covers the first and second apertures when a temperature of the strip is lower than a melting or softening temperature of the strip.

A further aspect of the subject matter disclosed in detail below is a system for energy storage system comprising: a container configured to support a plurality of battery cells; an agent supply port attached to the container; a plurality of battery cells disposed inside and supported by the container; an agent plenum in fluid communication with the agent supply port; a plurality of tubes disposed inside the container and in fluid communication with the agent plenum, wherein each tube is made of a first material having a first melting temperature and each tube comprises a closed end and a wall having a plurality of apertures; and a plurality of strips which are respectively attached to the plurality of tubes and which respectively cover the plurality of apertures, wherein each strip is made of a second material having a second melting temperature which is lower than the first melting temperature.

Other aspects of systems for suppressing adverse exothermic reactions in an energy storage container are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

FIG. 9 is a diagram representing a front view of rows of battery cells which are protected by a serpentine fluid distribution network in accordance with a further embodiment.

FIG. 10 is a block diagram identifying components of a system for electrically activating the release of exothermic reaction-suppressing agent in accordance with one embodiment.

Reference will hereinafter be made to the drawings in which similar elements in different drawings bear the same reference numerals.

DETAILED DESCRIPTION

Illustrative embodiments of systems for suppressing adverse exothermic reactions in an energy storage container are described in some detail below. However, not all features of an actual implementation are described in this specification. A person skilled in the art will appreciate that in the development of any such embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, the system described below is configured to suppress adverse exothermic reactions in energy storage containers which are installed as equipment or stored as cargo onboard an aircraft. However, the technology proposed herein is not limited in its application to aircraft and may also be applied to energy storage containers located on the ground or onboard other types of vehicles, such as automobiles, industrial trucks, and trains.

Figure 1:
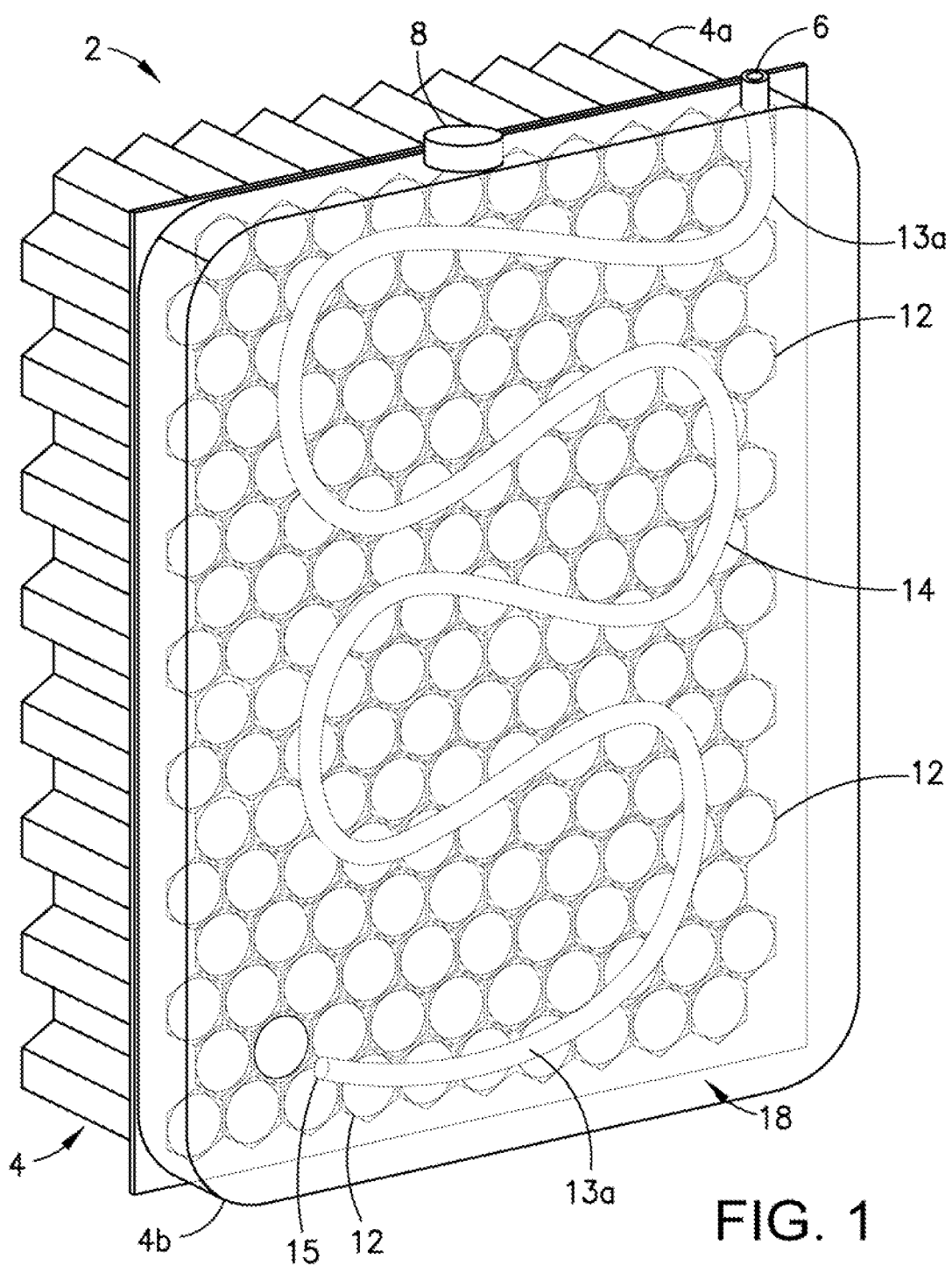
FIG. 1 is a diagram representing a three-dimensional (3-D) view of a battery module that incorporates components of a fluid distribution network for suppressing internal exothermic reactions in accordance with a first embodiment.

FIG. 1 is a diagram representing a 3-D view of an energy storage container in the form of a battery module 2 that incorporates components of a fluid distribution network for suppressing internal exothermic reactions in accordance with a first embodiment. The battery module 2 includes a plurality of battery cells 12 disposed inside and supported by an energy storage container 4 (hereinafter "container 4"). The container 4 includes a tray 4a that is configured to support the plurality of battery cells 12 and a lid 4b which partly defines a vent plenum 18. The vent plenum 18 is an open space between the battery cells 12 and the lid 4b. The battery module 2 further includes a vent 8 which is attached to the lid 4b. The vent 8 is in fluid communication with the vent plenum 18. For example, smoke in vent plenum 18 may exit the vent plenum 18 via the vent 8. The vent 8 is connected to a vent manifold not shown in FIG. 1 (but see vent manifold 60 in FIG. 4).

The battery module 2 depicted in FIG. 1 further includes a tube 14 having a closed end 15 and a continuous wall 13a. The tube 14 is situated in the vent plenum 18. An open end of tube 14 is connected to and in fluid communication with an agent supply port 6. In accordance with one proposed implementation, the agent supply port 6 is a fitting which is attached to the lid 4b of container 4. The agent supply port 6 is connected to an agent manifold (not shown in FIG. 1, but see agent manifold 58 in FIG. 4). The agent manifold in turn is connected to a pressurized container (not shown in FIG. 1, but see pressurized container 42 in FIG. 4), which container contains pressurized exothermic reaction-suppressing agent (see pressurized agent 16 in FIG. 4) in gas or liquid form.

In response to detection of an adverse exothermic reaction inside the container 4, exothermic reaction-suppressing agent is dispersed into the vent plenum 18 via tube 14. In accordance with some embodiments, the material of the continuous wall 13a of tube 14 is selected in dependence on the expected temperature inside vent plenum 18 when an adverse exothermic reaction occurs inside the container 4. More specifically, the tube material should have a melting temperature which is less than the temperature expected in the event of fire or thermal runaway inside container 4. Such a tube 14 is frequently referred to as a "fusible tube". The tube 14 may be pre-charged with pressurized exothermic reaction-suppressing agent so that the agent is released and dispersed from tube 14 during melting or softening of continuous wall 13a.

In accordance with one embodiment, the tube 14 may be made of isotropic plastic material having a variable wall thickness. More specifically, the tube 14 may have thinner portions of first thickness that melt faster than thicker portions of second thickness greater than the first thickness. For example, the thinner portions may be positioned and shaped so that openings in tube 14—which are formed when the thinner portions (but not the thicker portions) are melted—release the exothermic reaction-suppressing agent at strategic locations inside the battery module 2.

In accordance with other embodiments, the tube 14 has a perforated wall which does not melt during an adverse exothermic reaction; instead, the perforated wall of tube 14 has a plurality of aperture (perforations) which are closed by respective covers that melt or soften when an adverse exothermic reaction occurs inside container 4. In the event that the covers melt or soften, the perforated wall of tube 14 does not melt and exothermic reaction-suppressing agent is dispensed into vent plenum 18 via the now-open apertures in the perforated wall.

Figure 1A:
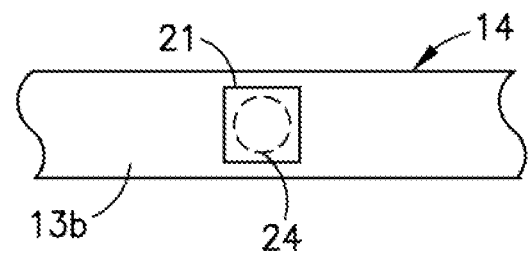
FIG. 1A is a diagram representing a side view of a portion of a tube having an aperture which is closed by a cover made of a material having a melting temperature less than the melting temperature of the tube material.

FIG. 1A is a diagram representing a side view of a portion of a tube 14 comprises a perforated wall 13b made of a first material having a first melting temperature and having a plurality of apertures 24 disposed between the open and closed ends of the tube 14. Although only one aperture 24 is shown in FIG. 1A, it should be appreciated that a plurality of apertures may be spaced at equal intervals along the length of the tube 14. Each aperture 24 is closed by a respective cover 21 made of a material having a second melting temperature which is lower than the first melting temperature. When the temperature inside the vent plenum 18 exceeds the second melting temperature (but not the first melting temperature), the covers 21 melt or soften to the point where the covers 21 rupture and pressurized exothermic reaction-suppressing agent inside tube 14 is dispensed into vent plenum 18 via the uncovered apertures 24.

The tube 14 with apertures 24 closed by fusible covers 21 may be pre-charged with pressurized exothermic reaction-suppressing agent prior to rupture of the fusible covers 21. Alternatively, the tube 14 may be filled with inert gas prior to rupture. In the latter case, exothermic reaction-suppressing agent flows into the tube 14 from the pressurized container 42 (see FIG. 4) and then flows out apertures 24 and into vent plenum 18.

Figure 2:
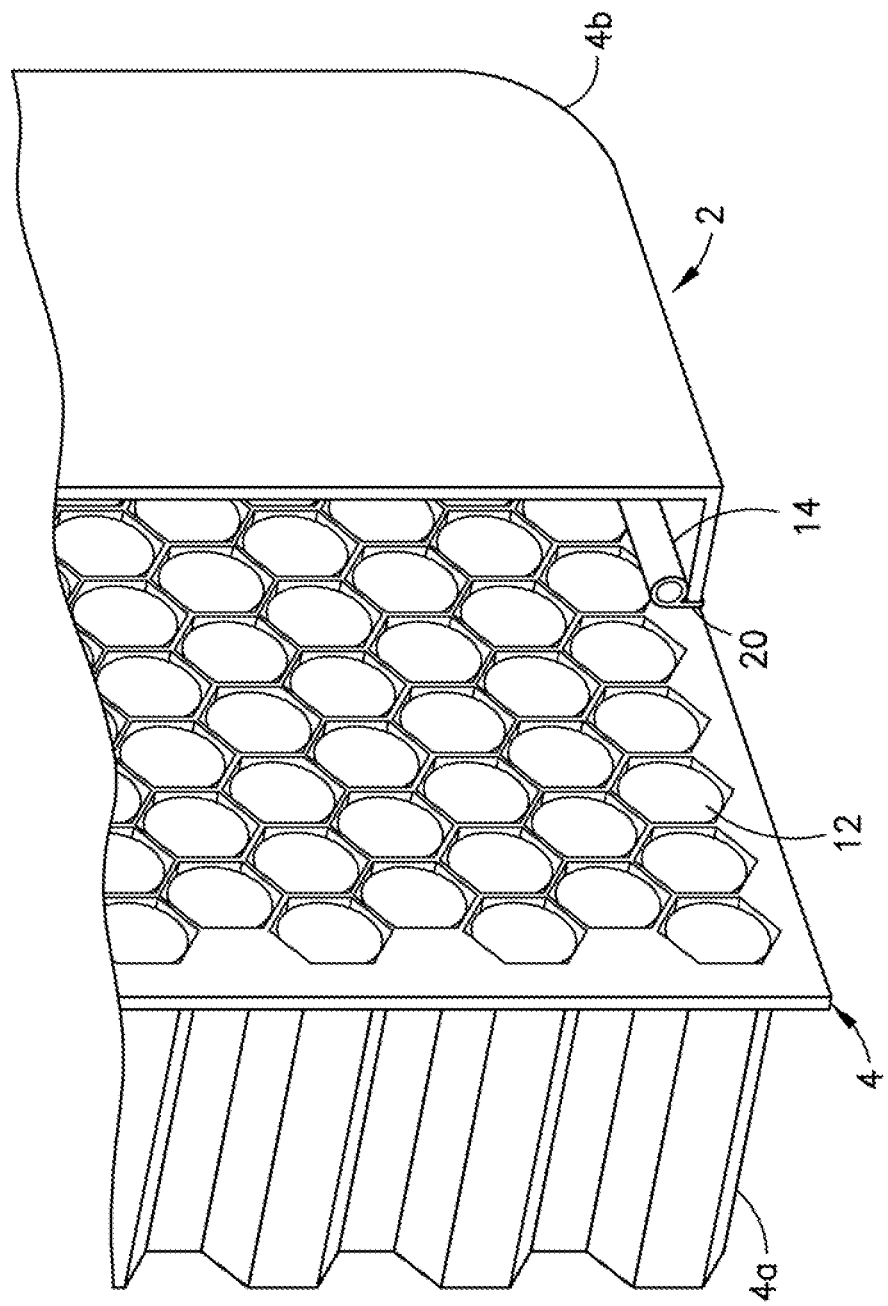
FIG. 2 is a diagram representing a 3-D view of a portion of a battery module that incorporates components of a fluid distribution network for suppressing internal exothermic reactions in accordance with a second embodiment.

FIG. 2 is a diagram representing a 3-D view of a portion of a battery module 2 that incorporates components of a fluid distribution network for suppressing internal exothermic reactions in accordance with a second embodiment. In this example, the tube 14 is integrally formed with an edge seal 20 that seals the container 4 at an interface of tray 4a and lid 4b. As previously described, tube 14 may comprise either a continuous wall made of material that melts or softens or a perforated wall with covers 21 made of material that melts or softens in response to an adverse exothermic reaction inside container 4. The tube 14 may extend one or more sides of a perimeter of the interface of tray 4a and lid 4b.

Figure 3:
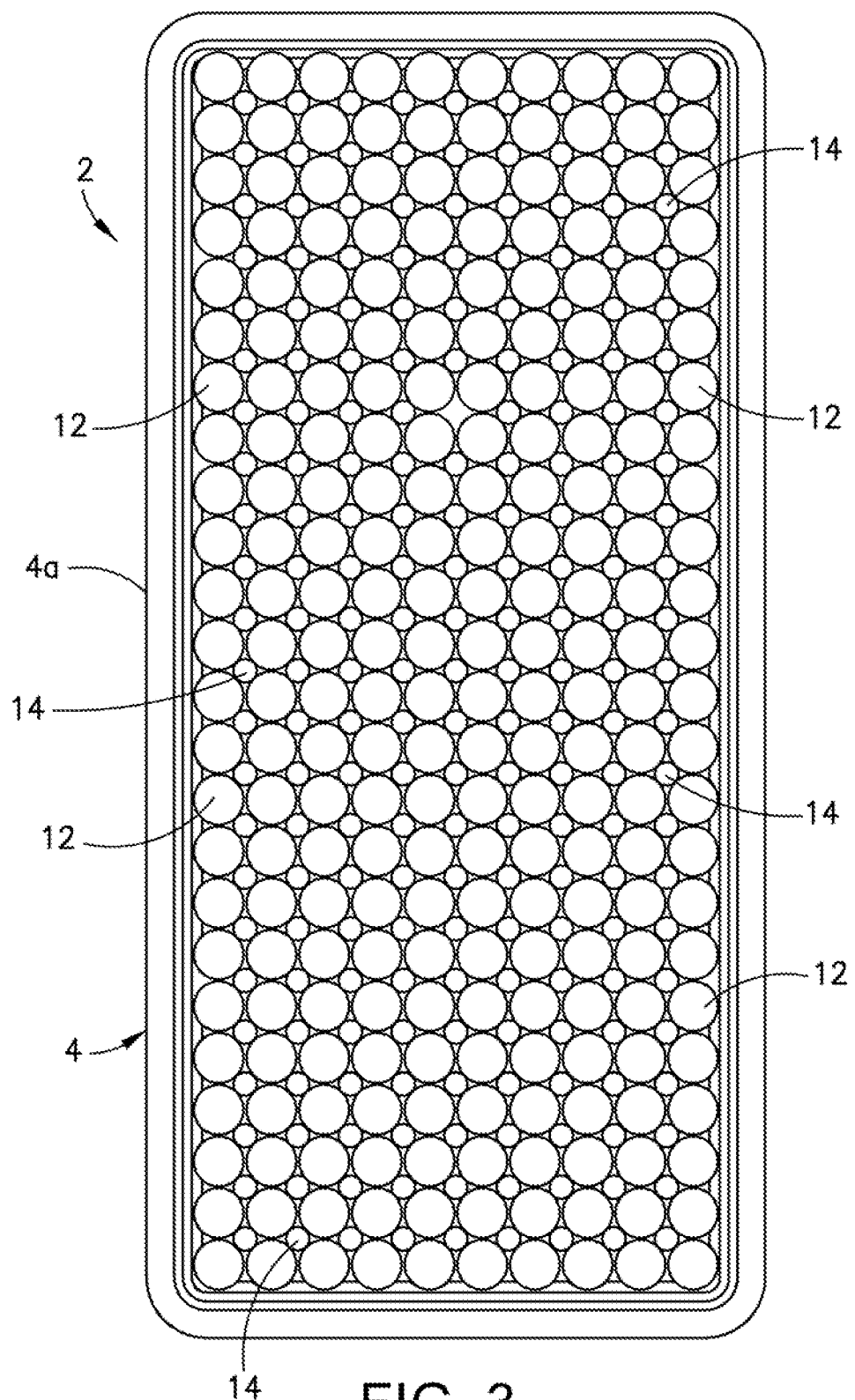
FIG. 3 is a diagram representing a 3-D view of a battery module that incorporates components of a fluid distribution network for suppressing internal exothermic reactions in accordance with a third embodiment.
Figure 3A:
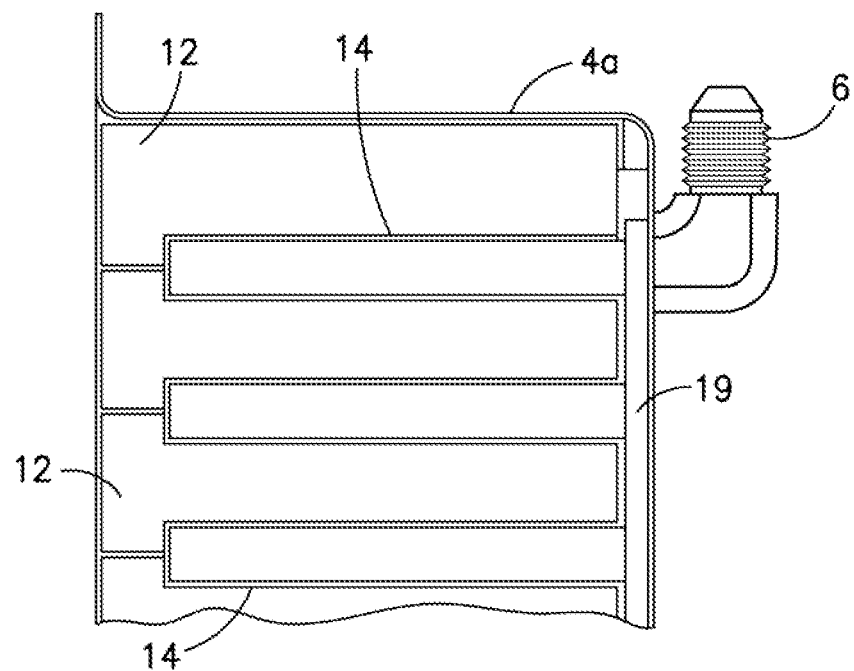
FIG. 3A is a diagram representing a front view of the battery module depicted in FIG. 3.
Figure 3B:
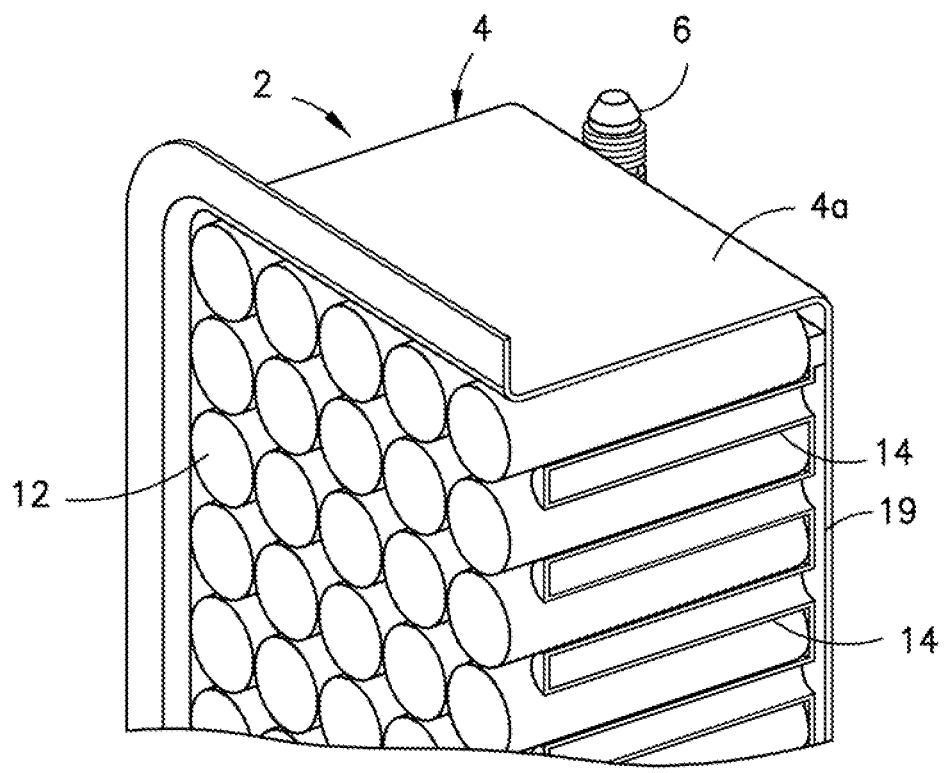
FIG. 3B is a cutaway diagram in which surface elements of the 3-D model have been removed to reveal internal features of the battery module depicted in FIG. 3.

FIG. 3 is a diagram representing a 3-D view of a battery module 2 (with lid removed) that incorporates components of a fluid distribution network for suppressing internal exothermic reactions in accordance with a third embodiment. FIG. 3A is a diagram representing a front view of the battery module 2 depicted in FIG. 3. FIG. 3B is a cutaway diagram in which surface elements of the 3-D model have been removed to reveal internal features of the battery module 2.

The battery module 2 depicted in FIGS. 3, 3A, and 3B includes a plurality of battery cells 12 disposed in parallel inside and supported by a tray 4a of an energy storage container 4. As best seen in FIG. 3A, the battery cells 12 are arranged in rows and columns such that each pair of adjacent battery cells in any one row and the adjacent pair of battery cells in an adjacent row form a respective cell array in which the centers of the four cells are located at the respective corners of a square.

The battery module 2 depicted in FIGS. 3, 3A, and 3B further includes a plurality of tubes 14 disposed between and parallel to the battery cells 12, the center of each tube 14 being located at the center of the square formed by the respective 2×2 cell array. Each tube 14 has a closed end 15 and an open end. The open ends of tubes 14 are connected to and in fluid communication with an agent plenum 19. The agent plenum 19 in turn is in fluid communication with an agent supply port 6. In this example, the agent supply port 6 is a fitting.

The agent plenum 19 and tubes 14 may be pre-charged with pressurized exothermic reaction-suppressing agent. Each tube 14 may comprise either a continuous wall made of material that melts or softens to release the agent or a perforated wall with covers (not shown in FIGS. 3, 3A, and 3B) made of material that melts or softens to release the agent in response to an adverse exothermic reaction inside the container 4. In an alternative proposed implementation, agent plenum 19 and tubes 14 may initially be filled with inert gas. Following detection of the adverse exothermic reaction, pressurized exothermic reaction-suppressing agent is supplied to agent plenum 19 from a pressurized container via agent supply port 6.

Figure 4:
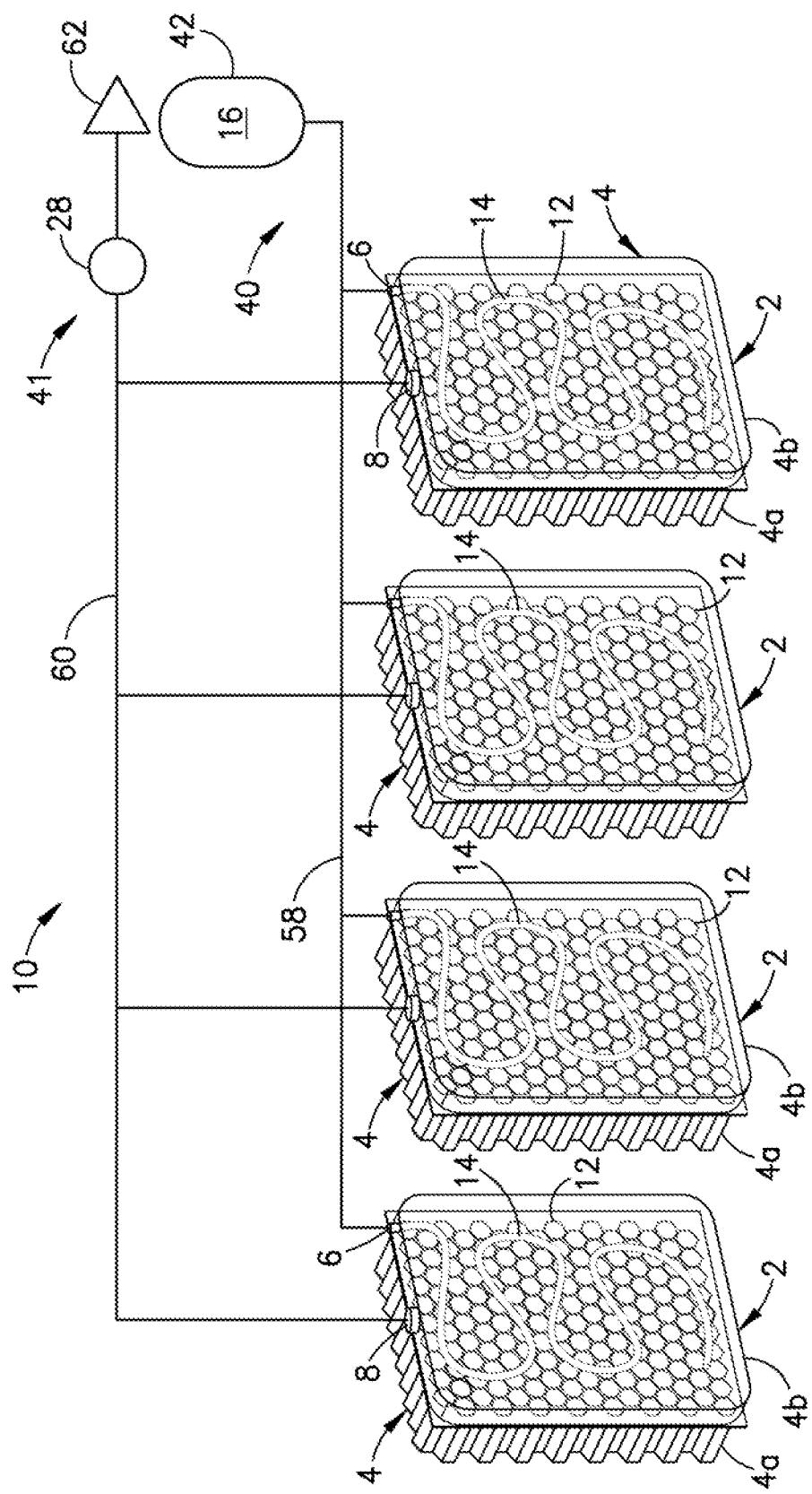
FIG. 4 is a hybrid diagram identifying components of a system in which a plurality of battery modules of the type depicted in FIG. 1 are each connected to a venting system and to a pressurized exothermic reaction-suppressing agent supply system in accordance with one embodiment.

FIG. 4 is a hybrid diagram identifying components of a battery system 10 in which a plurality of battery modules 2 of the type depicted in FIG. 1 are each connected to an agent supply system 40 and a venting system 41 in accordance with one embodiment. Each battery module 2 includes an agent supply port 6 connected to agent supply system 40 and a vent 8 connected to venting system 41.

The venting system 41 includes an overboard vent 62 which is connected to and in fluid communication with vents 8 via a vent manifold 60. The venting system 41 further includes a detector 28 (e.g., a smoke or gas detector) that is configured to detect the presence of fire by-products in the gas flowing through vent manifold 60.

The agent supply system 40 includes a pressurized container 42 that supplies pressurized exothermic reaction-suppressing agent 16 (hereinafter "pressurized agent 16") to agent supply ports 6 via an agent manifold 58. Agent will be passively distributed only to whichever battery modules have ruptured tubing. In the alternative, the supply of agent to ruptured tubing may be triggered by a controller (not shown in FIG. 4) in response to receipt of a signal from detector 28 indicating the occurrence of an adverse exothermic reaction inside any one of the battery modules 2.

Figure 5:
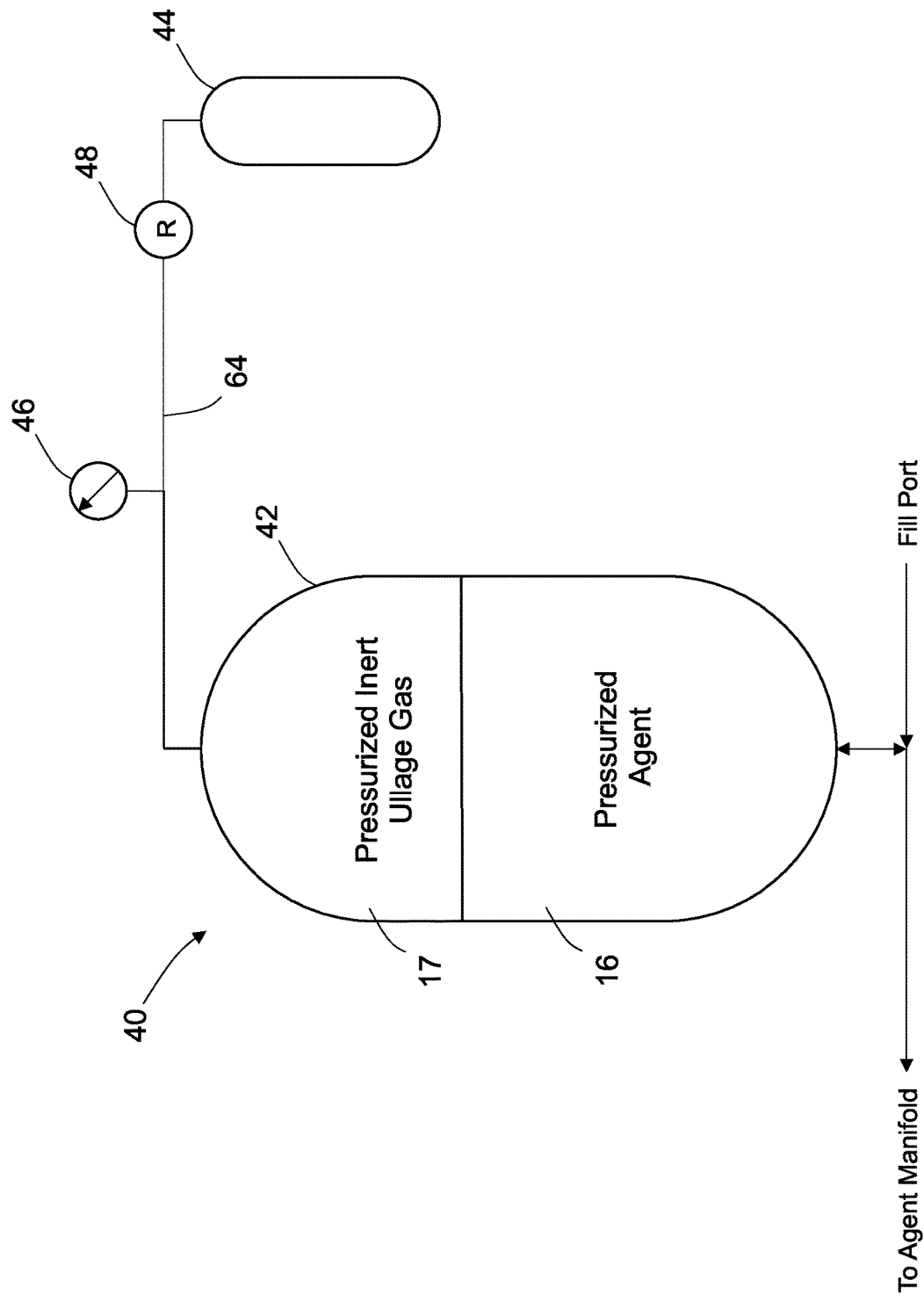
FIG. 5 is a process flow diagram identifying components of a pressurized exothermic reaction-suppressing agent supply system in accordance with one embodiment.

FIG. 5 is a process flow diagram identifying components of an agent supply system 40 in accordance with one embodiment. The agent supply system 40 includes a pressurized container 42 that contains pressurized agent 16 in the form of a liquid and pressurized inert ullage gas 17 (e.g., nitrogen) that occupies the space above pressurized agent 16 inside pressurized container 42. The pressurized container 42 is partially filled with pressurized agent 16 via a fill port prior to the occurrence of an adverse exothermic reaction inside a battery module 2. In response to the occurrence of an adverse exothermic reaction, the pressurized agent 16 flows out of pressurized container 42, through the agent manifold 58, and into the battery modules 2 (shown in FIG. 4).

The agent supply system 40 depicted in FIG. 5 further includes a pressurized container 44 that contains high-pressure inert make-up gas. The pressurized container 44 is connected to the pressurized container 42 via a pipe 64. The agent supply system 40 further includes a pressure gauge 46 that measures the ullage gas pressure inside the pipe 64 (which is equal to the ullage gas pressure inside pressurized container 42). The supply of inert ullage gas from pressurized container 44 to pressurized container 42 is regulated by a pressure regulator 48. In accordance with one proposed implementation, the pressure regulator 48 is a self-contained device having a diaphragm that maintains the ullage gas pressure constant as the pressurized agent 16 in pressurized container 42 is depleted.

Figure 6:
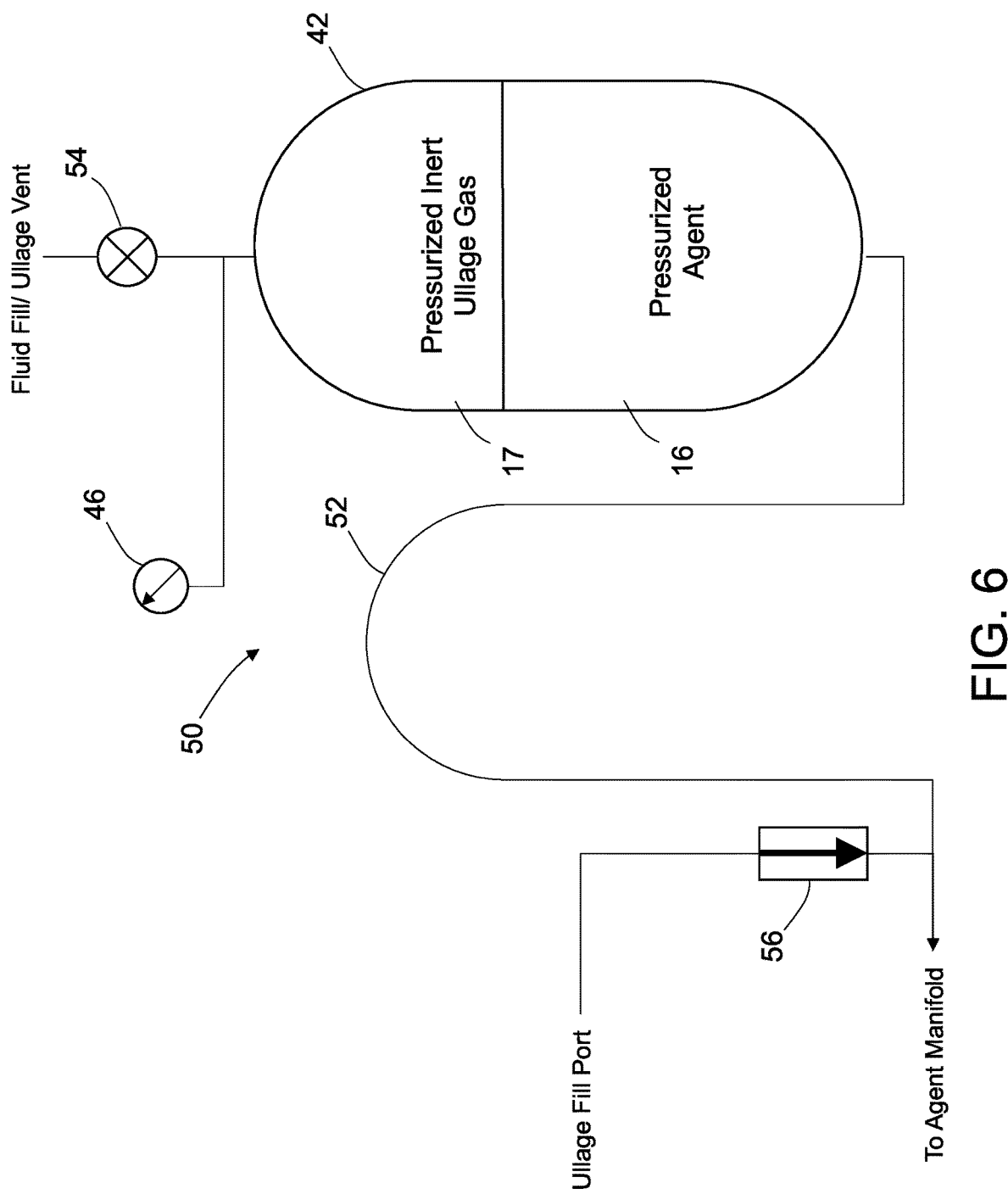
FIG. 6 is a process flow diagram identifying components of a pressurized exothermic reaction-suppressing agent supply system in accordance with an alternative embodiment.

FIG. 6 is a process flow diagram identifying components of an agent supply system 50 in accordance with an alternative embodiment in which the tubes 14 inside the battery modules 2 (see FIG. 4) are not pre-charged with liquid agent. The agent supply system 50 includes a pressurized container 42 that contains pressurized agent 16 in the form of a liquid and pressurized inert ullage gas 17. The ullage gas pressure inside the pressurized container 42 is measured by a pressure gauge 46. The pressurized container 42 is filled with fluid via a two-way valve 54. The ullage gas 17 may also be vented via two-way valve 54. The pressurized container 42 is in fluid communication with the agent manifold 58 (see FIG. 4) via a ∩-shaped pipe 52. More specifically, the ∩-shaped pipe 52 is connected to the agent supply ports 6 via the agent manifold 58. Prior to activation of the fire suppression system, the tubes 14 inside the battery modules 2 are filled with inert gas via a one-way valve 56. The ∩-shaped pipe 52 keeps pressurized agent 16 out of the agent manifold 58 until the fusible tubes or fusible covers rupture. Before a tube ruptures somewhere, there is nowhere for the gas in the network to flow, thereby displacing the liquid suppression agent. The decrease in pressure in the agent manifold 58 due to tubing rupture enables the pressurized agent 16 to flow through the ∩-shaped pipe 52, at least some portion of agent manifold 58, and then into any battery modules 2 in which the tubing has ruptured. The presence of ullage gas 17 in pipes connecting the agent manifold 58 to battery modules 2 with intact tubing prevents liquid suppression agent from being trapped in those pipes.

In alternative implementations of the agent supply system, the pressurized agent 16 may be a clean agent. A clean agent is an electrically non-conducting, volatile or gaseous fire extinguishant that does not leave a residue upon evaporation. Clean agents consist of two broad classes of agent: inert gas agents and halocarbon agents. Typical inert gases include nitrogen, argon, carbon dioxide, and mixtures thereof. Inert gas agents cannot be compressed to the liquid state, and therefore must be stored as high-pressure gases. Halocarbon agents such as hydrofluorocarbon (HFC) can be stored as liquids, allowing for a much larger mass of agent to be stored in the same volume compared with inert gases.

In accordance with the embodiments depicted in FIGS. 5 and 6, the pressurized agent 16 is a liquid at ambient conditions. The pressurized agent 16 should be non-reactive and have high dielectric strength, high thermal mass, and low viscosity. One suitable clean agent is Novec™ 1230 fire protection fluid which is commercially available from 3M Company, St. Paul, Minn. The chemical name for this agent is dodecafluoro-2-methylpentan-3-one. Novec™ 649, Novec™ 7100 (a proprietary hydrofluoroether from 3M), or an ethylene glycol/water mixture are also potential alternatives.

Figure 7:
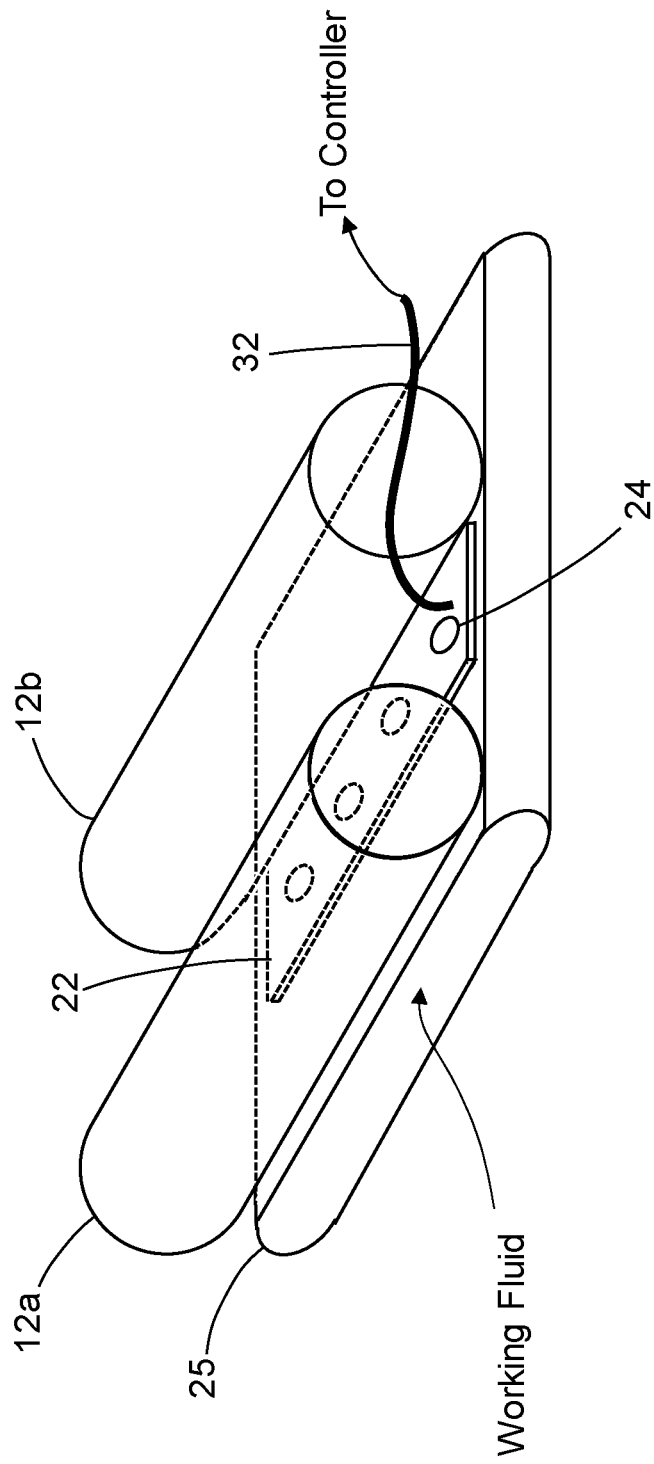
FIG. 7 is a diagram representing a 3-D view of a portion of a battery module that incorporates means for liquid cooling for enabling passive and active thermal runaway propagation mitigation.

FIG. 7 is a diagram representing a 3-D view of a portion of a battery module that incorporates means for liquid cooling for enabling passive and active thermal runaway propagation mitigation. The battery module components depicted in FIG. 7 include multi-port extruded (MPE) tubing 25 and a pair of battery cells 12a and 12b disposed adjacent to MPE tubing 25. The MPE tubing 25 comprises a plurality of internal walls (not shown in FIG. 7) which partition the interior volume of MPE tubing 25 into a plurality of flow channels. The working fluid (pressurized agent) flows through the flow channels. In alternative implementations, the internal walls may be omitted, the result being 0 a single flat flow-through tube.

Figure 8:
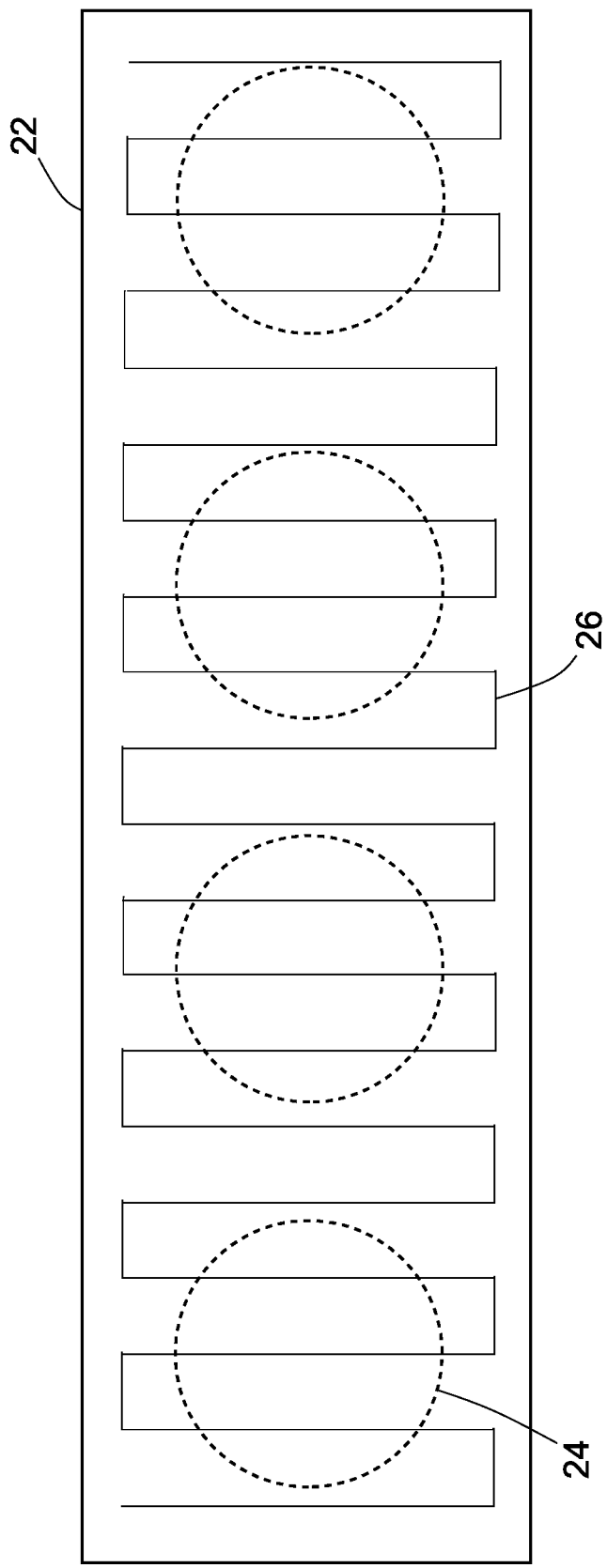
FIG. 8 is a diagram showing a serpentine heating element attached to a fusible strip which covers a plurality of apertures.

In addition, the MPE tubing 25 has a plurality of apertures 24 (indicated by dashed ellipses in FIG. 7) which are disposed in an area between battery cells 12a and 12b. The apertures 24 are covered by a fusible strip 22 which is brazed to the MPE tubing 25. The fusible strip 22 is made of a material that melts when heated to a melting temperature by a heating element not shown in FIG. 7. FIG. 8 shows a serpentine heating element 26 attached to the fusible strip 22 which covers the plurality of apertures 24 (indicated by dashed circles). The heating element 26 converts electrical energy into heat sufficient to melt the material of fusible strip 22, thereby enabling the working fluid to escape from MPE tubing 25 into the energy storage container via apertures 24.

Referring again to FIG. 7, the heating element 26 receives direct current (DC) from a 5-V DC voltage supply (not shown) via an insulated electrical wire 32. The supply of direct current to the heating element 26 may be activated manually by a pilot or automatically by a programmed controller in response to the occurrence of an adverse exothermic reaction inside the battery module. Optionally, the fusible strip 22 may be made of a material which also melts when the temperature inside the battery module rises due to an adverse exothermic reaction. Such an implementation provides a system capable of either passive or active activation of the release of exothermic reaction-suppressing agent. In accordance with one proposed implementation, the MPE tubing 25 is made of aluminum, the fusible strip is made of tin, and the heating element is made of Nichrome.

FIG. 9 is a diagram representing a front view of rows of battery cells 12 which are protected by a fluid distribution network in accordance with a further embodiment. The fluid distribution network in this example includes a serpentine tube 14 having parallel segments with two rows of battery cells 12 disposed therebetween. The serpentine tube 14 may be pre-charged with pressurized agent 16 which is released into the volume of atmosphere partly occupied by the battery cells 12.

FIG. 10 is a block diagram identifying components of a suppression activation system 30 for electrically activating a plurality of heating elements 26 in accordance with one embodiment. The suppression activation system 30 includes a plurality of switches 34 which are electrically connected to the heating elements 26 and a DC power supply 36 which is electrically connected to the switches 34 for providing direct current to the heating elements 26 when the switches are closed. The suppression activation system 30 further includes a controller 38 which is electrically connected to and configured to control the states of the switches 34. In addition, the suppression activation system 30 includes a detector 28 which is electrically connected to the controller 38. As previously described, the detector 28 is configured to output an electrical signal to the controller 38 in response to the presence of an adverse exothermic reaction, e.g., inside a battery module 2 (see FIG. 4). The controller 38 closes switches 34 in response to receipt of a signal from detector 28 indicating the occurrence of an adverse exothermic reaction inside a battery module 2. The heating elements 26 and DC power supply 36 may be designed to ensure that the DC power supplied to the heating elements 26 is sufficient to change the state of the fusible strip to release the pressurized agent.

The embodiments disclosed above use one or more controllers. Such devices typically include a processor or computer, such as a central processing unit, a microprocessor, a reduced instruction set computer processor, an application specific integrated circuit, a programmable logic circuit, a field-programmable gate array, a digital signal processor, and/or any other circuit or processing device capable of executing the functions described herein.

While systems for suppressing adverse exothermic reactions in an energy storage container have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. An energy storage system comprising:
a container configured to support a plurality of battery cells;
an agent supply port attached to the container;
a plurality of battery cells disposed inside and supported by the container;
a tube disposed inside the container and having a closed end and an open end, the open end of the tube being in fluid communication with the agent supply port, the tube comprising fusible portions which are designed to melt or soften at a temperature which is lower than the melting or softening temperature of another portion of the tube;
an agent manifold connected to the agent supply port and disposed outside the container;
a pressurized container disposed outside the container and containing exothermic reaction-suppressing agent in a fluid state; and
a ∩-shaped pipe having one end in fluid communication with the pressurized container and another end in fluid communication with the agent manifold, the n-shaped pipe being disposed outside the container,
wherein the ∩-shaped pipe is configured such that when the tube, agent manifold, and ∩-shaped pipe are filled with inert ullage gas, the ∩-shaped pipe keeps exothermic reaction-suppressing agent out of the agent manifold until a fusible portion of the tube ruptures.

2. The energy storage system as recited in claim 1, wherein the other portion of the tube comprises a relatively thicker portion of a wall and the fusible portion of the tube comprises a relatively thinner portion of the wall.

3. The energy storage system as recited in claim 1, wherein the other portion of the tube comprises a wall having an aperture and the fusible portion of the tube comprises a fusible cover that covers the aperture when a temperature of the fusible cover is lower than a melting or softening temperature of the fusible cover.

4. The energy storage system as recited in claim 1, wherein the other portion of the tube comprises a wall having first and second apertures and the fusible portion of the tube comprises a strip that covers the first and second apertures when a temperature of the strip is lower than a melting or softening temperature of the strip.

5. The energy storage system as recited in claim 4, further comprising a heating element attached to the strip.

6. The energy storage system as recited in claim 5, wherein the tube is made of an aluminum alloy, the strip is made of a tin alloy, and the heating element is made of nichrome.

7. The energy storage system as recited in claim 5, further comprising a switch electrically connected to the heating element, a power supply electrically connected to the switch, and a controller electrically connected to and configured to control a state of the switch.

8. The energy storage system as recited in claim 7, further comprising a detector electrically connected to the controller and configured to output an electrical signal to the controller in response to an occurrence of an adverse exothermic reaction inside the container.

9. The energy storage system as recited in claim 1, wherein the container is configured to define a vent plenum, the system further comprising a vent in fluid communication with the vent plenum, wherein the tube occupies space in the vent plenum.

10. The energy storage system as recited in claim 9, wherein the container comprises a tray that supports the plurality of battery cells and a cover that partly defines the vent plenum, the system further comprising an edge seal disposed between the tray and the cover and integrally formed with the tube.

11. The energy storage system as recited in claim 1, wherein the plurality of battery cells comprises first through fourth battery cells arranged in a 2×2 array, the tube being disposed at a center of the 2×2 array and parallel to the first through fourth battery cells.

12. An energy storage system comprising:
a container configured to support a plurality of battery cells;
an agent supply port attached to the container;
a plurality of battery cells disposed inside and supported by the container;
an agent plenum in fluid communication with the agent supply port;
a plurality of tubes disposed inside the container and in fluid communication with the agent plenum, wherein each tube is made of a first material having a first melting temperature and each tube comprises a closed end and a wall having a plurality of apertures;
a plurality of strips which are respectively attached to the plurality of tubes and which respectively cover the plurality of apertures, wherein each strip is made of a second material having a second melting temperature which is lower than the first melting temperature;
an agent manifold connected to the agent supply port and disposed outside the container;
a pressurized container disposed outside the container and containing exothermic reaction-suppressing agent in a fluid state; and
a ∩-shaped pipe having one end in fluid communication with the pressurized container and having another end in fluid communication with the agent manifold, wherein the ∩-shaped pipe is disposed outside the container,
wherein the ∩-shaped pipe is configured such that when the tube, agent manifold, and ∩-shaped pipe are filled with inert ullage gas, the ∩-shaped pipe keeps exothermic reaction-suppressing agent out of the agent manifold until at least one of the apertures of the tube is uncovered.

13. The energy storage system as recited in claim 12, further comprising a plurality of heating elements respectively attached to the plurality of strips.

14. The energy storage system as recited in claim 13, wherein the tubes are made of an aluminum alloy, the strips are made of a tin alloy, and the heating elements are made of nichrome.

15. The energy storage system as recited in claim 13, further comprising a plurality of switches electrically respectively connected to the plurality of heating elements, a power supply electrically connected to the plurality of switches, and a controller electrically connected to and configured to control states of the plurality of switches.

16. The energy storage system as recited in claim 15, further comprising a detector electrically connected to the controller and configured to output an electrical signal to the controller in response to an occurrence of an adverse exothermic reaction inside the container.

17. An energy storage system comprising:
a plurality of containers, each container being configured to support a respective plurality of battery cells;
a respective agent supply port attached to a respective one of the plurality of containers;
a respective plurality of battery cells disposed inside and supported by a respective one of the plurality of containers;
a respective tube disposed inside a respective one of the plurality of containers and in fluid communication with the respective agent supply port, wherein each tube has a closed end and an open end, the open end of the tube being in fluid communication with the agent supply port, the tube comprising fusible portions which are designed to melt or soften at a temperature which is lower than the melting or softening temperature of another portion of the tube;
an agent manifold connected to the plurality of agent supply ports and disposed outside the containers;
a pressurized container disposed outside the container and containing exothermic reaction-suppressing agent in a fluid state; and
a pipe having one end in fluid communication with the pressurized container and another end in fluid communication with the agent manifold, the pipe being disposed outside the containers,
wherein the pipe is configured such that when the tubes, agent manifold, and pipe are filled with inert ullage gas, the pipe keeps exothermic reaction-suppressing agent out of the agent manifold until a fusible portion of one of the plurality of tubes ruptures.

18. The energy storage system as recited in claim 17, wherein the other portion of each tube comprises a relatively thicker portion of a wall and the fusible portion of each tube comprises a relatively thinner portion of the wall.

19. The energy storage system as recited in claim 17, wherein the other portion of each tube comprises a wall having an aperture and the fusible portion of each tube comprises a fusible cover that covers the aperture when a temperature of the fusible cover is lower than a melting or softening temperature of the fusible cover.

20. The energy storage system as recited in claim 17, wherein the other portion of each tube comprises a wall having first and second apertures and the fusible portion of each tube comprises a strip that covers the first and second apertures when a temperature of the strip is lower than a melting or softening temperature of the strip.

* * * * *